June 13, 1967  G. L. WILDE ET AL  3,325,144
BLADE FOR USE IN A FLUID FLOW MACHINE
Filed Dec. 2, 1965
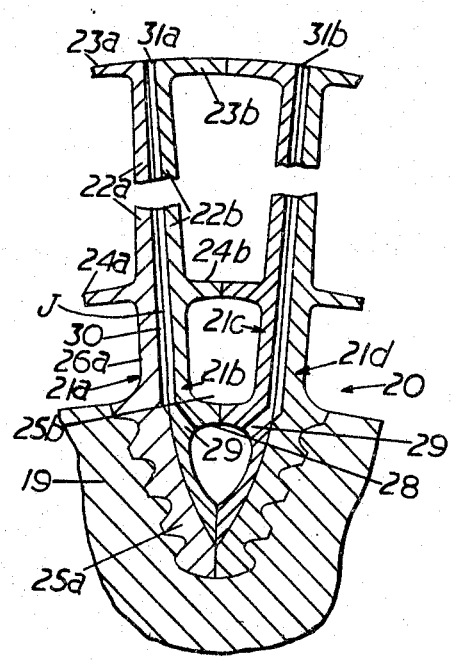
Inventors
Geoffrey Light Wilde
Arthur Bill
Thomas Steel
Alan George Newton
By Cushman, Darby & Cushman  Attorneys

United States Patent Office 3,325,144
Patented June 13, 1967

3,325,144
BLADE FOR USE IN A FLUID FLOW MACHINE
Geoffrey Light Wilde and Arthur Bill, Derby, Thomas Steel, Littleover, Derby, and Alan G. Newton, Spondon, Derby, England, assignors to Rolls-Royce Limited, Derby, Derbyshire, England, a British company
Filed Dec. 2, 1965, Ser. No. 511,155
Claims priority, application Great Britain, Dec. 5, 1964, 49,589/64
4 Claims. (Cl. 253—39.15)

The present invention relates to a blade for use in a fluid flow machine.

According to the present invention, there is provided a blade unit for use in a fluid flow machine, having two spaced apart aerofoil-shaped vanes and a common root, said blade when seen in a section taken perpendicular to the axis of the rotor having two substantially identical inner parts, which are secured face to face in mirror image relationship, and two substantially identical outer parts which are arranged in mirror image relationship and which are respectively secured to their respective inner parts, each inner part and its adjacent outer part having portions which together constitute a complete said aerofoil-shaped vane, and each inner part and its adjacent outer part being shaped to provide at least one cooling fluid passage between them, the two inner parts and the two outer parts having portions which together constitute the whole of said common root and the root portions of the inner parts being formed to define between them a chamber which communicates with each said cooling fluid passage.

The cooling fluid passages may communicate with a common space in the blade which is adapted to be supplied with cooling fluid.

The common space may be in the root of the blade.

The parts of the blade may be secured to each other in any manner suited to the material of the parts. For example, blades formed from the nickel-based alloy sold under the registered trademark "Nimonic" may be diffusion bonded under heat and pressure.

The invention also provides a fluid flow machine provide with blades as described above.

The invention will now be described, by way of example only, with reference to the accompanying drawing which is a front view of a turbine blade in accordance with the invention mounted in a turbine disc of a gas turbine engine.

In the drawing there is shown a section view taken perpendicular to the disc axis, of a blade 20 in accordance with the invention which has been formed from substantially identical outer parts 21a, 21d and substantially identical inner parts 21b, 21c and which is mounted in a turbine disc 19. Only parts 21a and 21b will be described since they are substantially mirror images of parts 21c and 21d respectively.

Part 21a is seen to comprise a part 22a of an aerofoil-shaped vane portion, the part 22a having a shroud portion 23a at one end and a platform portion 24a at the other end, the platform portion 24a being connected to a root portion 25a by means of a shank portion 26a. Part 21b is seen to comprise a part 22b of an aerofoil-shaped portion the part 22b having a shroud portion 23b at one end, a platform portion 24b and a root portion 25b at the other end, the root portion 25b defining part of a chamber 28, in the assembled blade 20, for the entry of cooling air.

A passage 29 formed in the root portion 25b communicates at one end with the chamber 28 and at the other end with a conduit 30 for the passage of cooling air between parts 21a and 21b.

Each conduit 30 may be formed by the cooperation of channels in the cooperable surfaces of parts 21a, 21b or it may be formed by the cooperation of one of parts 21a, 21b with a channel in the other of parts 21a, 21b. Thus cooling air which enters the blade 20 at the chamber 28 passes to the two conduits 30 from whence it passes to the leading and trailing edges of the blade via apertures 31a, 31b respectively at the shroud thereof.

The four parts 21a, 21b, 21c and 21d all cooperate to form a blade with a fir-tree root, the blades forming conduits for a working fluid between their aerofoil-shaped portions.

When the blade is fitted to the turbine disc 19, the chamber 28 is disposed within the rim of the disc. Cooling air passing through the chamber thus cools the disc rim.

It can be seen that the joint J between the parts 22a, 22b, is positioned such that the parts are of approximately equal thickness. It the joint were positioned otherwise, then one of the parts may be unnecessarily thin and consequently more difficult to manufacture.

The four parts of blade 20 are secured to each other by any suitable means such as diffusion bonding (i.e. heating the parts to a bonding temperature below the melting point, while the parts are in strong mutual pressure contact).

Blades in accordance with the invention may be used in compressors: for example, they may be used in the compressors of gas-turbine engines.

It will be appreciated that the provision of two or more aerofoil-shaped portions on one blade root increases the number of blades that can be accommodated around the periphery of a given turbine disc for a given number of fir-tree root receiving grooves therein.

Alternatively, a given number of blades in accordance with the invention may be accommodated around the periphery of a turbine disc having a diameter which is reduced in comparison with the diameter which would otherwise be necessary to accommodate the given number of blades. This latter case presents the advantage that materials having high cold strength, but poor strength-temperature characteristics can be used for the turbine disc 19 which, because of the reduced diameter is further from the working fluid conduits between the blades and is not subjected to the high temperatures and temperature gradients which would otherwise prevail. Such a reduced diameter turbine disc could also be formed from materials having a relatively high strength to weight ratio, but not necessarily a high absolute tensile strength since the centrifugally induced stresses during rotation are reduced due to the reduced diameter and the reduced weight of the disc.

We claim:
1. A blade unit for use in a disc of a fluid flow machine comprising: two spaced apart aerofoil-shaped vanes and a common root, said blade, when seen in a section taken perpendicular to the axis of the rotor, having two substantially identical inner parts arranged face to face in mirror image relationship, and two substantially identical outer parts arranged in mirror image relationship and respectively secured to their respective inner parts, each inner part and its adjacent outer part having portions which together constitute a complete one of said aerofoil-shaped vanes, and each inner part and its adjacent outer part being shaped to provide at least one cooling fluid passage between them, the two inner parts and the two outer parts having portions which together constitute the whole of said common root and the root portions of the inner parts being formed to define between them a chamber which communicates with each said cooling fluid passage.

2. A blade as claimed in claim 1 in which each of said inner and outer parts has radially spaced platform and shroud portions which are secured to like portions of the adjacent said part.

3. A blade as claimed in claim 2 in which all the said parts are integrally secured to each other.

4. A blade as claimed in claim 1 wherein the said portions which together constitute a complete aerofoil-shaped vane are of substantially equal thickness when seen in said section.

References Cited

UNITED STATES PATENTS

| | | | |
|---|---|---|---|
| 3,017,159 | 1/1962 | Foster et al. | 253—39.15 |
| 3,034,764 | 5/1962 | Davis et al. | 253—77 |
| 3,164,367 | 1/1965 | Lynch | 253—39.15 |
| 3,266,770 | 8/1966 | Harlow | 253—39.15 |

MARTIN P. SCHWADRON, *Primary Examiner.*

EVERETTE A. POWELL, Jr., *Examiner.*